(12) United States Patent
Shim et al.

(10) Patent No.: US 10,072,719 B2
(45) Date of Patent: Sep. 11, 2018

(54) BRAKE DISK HAVING DOUBLE COOLING STRUCTURE

(71) Applicants: Hyundai Motor Company, Seoul (KR); DACCcarbn Co., Ltd., Jeonju-si (KR)

(72) Inventors: Jae Hun Shim, Hwaseong-si (KR); Byung Jun Park, Suwon-si (KR); Joung Hee Lee, Suwon-si (KR); Gab Bae Jeon, Hwaseong-si (KR); Dong Won Im, Gimhae-si (KR); Yeon Ho Choi, Jeonju-si (KR); Kang Yoo, Jeonju-si (KR); Nam Cheol Lee, Jeonju-si (KR)

(73) Assignees: Hyundai Motor Company, Seoul (KR); DACCcarbn Co., Ltd., Jeonju-si (KR)

( * ) Notice: Subject to any disclaimer, the term of this patent is extended or adjusted under 35 U.S.C. 154(b) by 0 days.

(21) Appl. No.: 15/380,847

(22) Filed: Dec. 15, 2016

(65) Prior Publication Data

US 2018/0051761 A1 Feb. 22, 2018

(30) Foreign Application Priority Data

Aug. 22, 2016 (KR) ........................ 10-2016-0106087

(51) Int. Cl.
*F16D 65/10* (2006.01)
*F16D 65/12* (2006.01)
*F16D 65/02* (2006.01)

(52) U.S. Cl.
CPC .... *F16D 65/128* (2013.01); *F16D 2065/1328* (2013.01)

(58) Field of Classification Search
CPC .............................. F16D 65/12; F16D 65/128
USPC ............ 188/218 A, 218 XL, 264 A, 264 AA
See application file for complete search history.

(56) References Cited

U.S. PATENT DOCUMENTS

| | | | | |
|---|---|---|---|---|
| 6,119,820 A * | 9/2000 | Steptoe | ................. | F16D 65/128 188/218 XL |
| 6,142,267 A * | 11/2000 | Sporzynski | ............. | F16D 65/12 188/218 XL |
| 6,796,405 B2 * | 9/2004 | Ruiz | ....................... | F16D 65/12 188/264 A |
| 6,962,242 B2 * | 11/2005 | Conti | .................... | F16D 65/123 188/264 AA |
| 8,763,768 B2 * | 7/2014 | Lathwesen | ............ | F16D 65/123 188/218 XL |

(Continued)

FOREIGN PATENT DOCUMENTS

| | | |
|---|---|---|
| EP | 1 881 224 B1 | 1/2013 |
| JP | 3393657 B2 | 4/2003 |
| JP | 3396981 B2 | 4/2003 |

(Continued)

*Primary Examiner* — Christopher P Schwartz
(74) *Attorney, Agent, or Firm* — Morgan, Lewis & Bockius LLP

(57) ABSTRACT

A disk brake having a double self-cooling structure to suppress thermal deformation may include a brake disk having a double cooling structure, which is capable of securing cooling performance of the disk while reducing cost and weight of a vehicle compared with the prior art by configuring a self-cooling structure of the disk that can suppress thermal deformation due to excessive frictional heat during braking a vehicle.

8 Claims, 4 Drawing Sheets

(56) References Cited

U.S. PATENT DOCUMENTS

2004/0178029 A1* 9/2004 Hoyte ............... F16D 65/12
                                                 188/218 XL

FOREIGN PATENT DOCUMENTS

| JP | 4841108 B2 | 12/2011 |
|---|---|---|
| JP | 5686380 B2 | 3/2015 |
| KR | 10-2006-0062495 A | 6/2006 |
| KR | 10-2006-0066880 A | 6/2006 |
| KR | 10-0652019 B1 | 12/2006 |
| KR | 10-2014-0026232 A | 3/2014 |

* cited by examiner

BRAKE DISK HAVING DOUBLE COOLING STRUCTURE

CROSS-REFERENCE(S) TO RELATED APPLICATION

The present application claims priority to Korean Patent Application No. 10-2016-0106087 filed on Aug. 22, 2016, the entire contents of which is incorporated herein for all purposes by this reference.

BACKGROUND

Field of the Invention

The present invention relates to a brake disk having a double cooling structure, and more particularly to a brake disk having a double self-cooling structure to inhibit thermal deformation.

Description of Related Art

In general, a vehicle is stopped by a brake wherein the brake generates braking force by utilizing disks rotating along with vehicle wheels and friction members contacting the disk on both faces of the disk to cause frictional force.

On the other hand, since high output of an engine is required and weight of a vehicle is increased according to upgrade of vehicles, load of a brake is increased during braking and hence excessive heat is caused by friction between a brake disk and a friction member. Accordingly, thermal deformation of the disk and deterioration of the friction member occur, with the result that noise, vibration and harshness (NVH) performance and braking feeling are reduced due to deformation of the disk and fading of the friction member.

In order to reduce thermal deformation of the disk, a conventional brake has obtained a suitable heat capacity by increasing the size of the disk.

However, increasing the size of the disk causes an increase in cost and weight of the vehicle. Ultimately, there is a problem that performance of riding and handling (R&H) deteriorates due to an increase in unsprung mass.

In the case of a high grade vehicle, thermal deformation of the disk is reduced by introducing flow of external air into the disk by means of cooling ducts for cooling the disk. However, there is also a problem that even adding the cooling duct causes an increase in cost and weight of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a brake disk having a double cooling structure, which is configured for securing cooling performance of the disk while reducing cost and weight of the vehicle compared with the prior art by configuring a self-cooling structure of the disk that can suppress thermal deformation due to excessive frictional heat during braking the vehicle.

In one aspect, the present invention provides a brake disk having a double cooling structure, including a plurality of vanes disposed between two disk plates, the vanes being formed integrally with the brake disk, and cooling channels and the air passage formed between the disk plates to allow air to flow therethrough, wherein each of the cooling channels is formed every between the plurality of vanes, the air passage is formed to be located more inward than the plurality of vanes with respect to a radial direction of the disk plates, and the cooling channels and the air passage are fluidic communication with each other.

Specifically, the cooling channels are formed to allow air to flow in a radial direction of the disk plates while the air passage is formed to allow air to flow in a circumferential direction of the disk plates.

In an exemplary embodiment, a plurality of mounting portions are formed between the disk plates in such a manner of being located more inward than the air passage with respect to a radial direction.

The plurality of mounting portions are formed between a hat part seating bore formed in the central portion of one of the disk plates (hereinafter, referred to as a first disk plate) and a first side surface of the other disk plate (hereinafter, referred to as a second disk plate) and arranged in a circumferential direction around a shaft bore formed in the central portion of the other disk plate.

Further, the plurality of mounting portions is formed respectively with bushing holes penetrating in an axial direction wherein the bushing holes are formed in such a manner of penetrating into the other disk plate.

Further, the cooling channels are in a straight or spiral form with respect to a central axis of the brake disk and the vanes include a prime number to reduce resonance of the brake disk.

According to an exemplary embodiment of the present invention, it is possible to configure a self-cooling structure that can suppress thermal deformation of the brake disk, thereby enhancing cooling performance for preventing the thermal deformation without increasing a size of the disk brake, compared with the prior art. Further, as the cooling ducts for cooling the disk in the prior art can be removed, it is possible to reduce cost and weight of a vehicle and also enhance packaging capability of an engine room.

Still further, according to the invention, it is possible to design a structure in which vanes include a prime number, thereby reducing resonance so that an NVH issue can be reduced or avoided.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
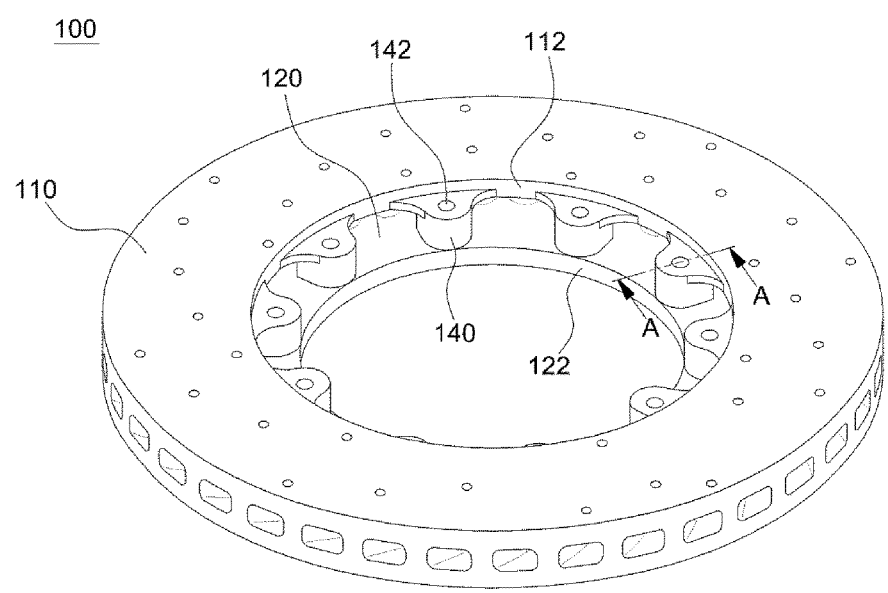
FIG. 1 is a perspective view illustrating a brake disk according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Preferred embodiments of the present invention will now be described in detail with reference to the accompanying drawings.

As is known, the brake disk is in frictional contact with a friction member when the vehicle is braked by a brake and generates frictional heat during generating braking force.

According to an exemplary embodiment of the present invention, the brake disk may have a self-cooling structure to suppress thermal deformation due to frictional heat, thereby securing cooling performance.

In particular, the brake disk according to an exemplary embodiment of the present invention can secure much more effective cooling performance by virtue of a double cooling structure (or two-stage ventilating structure).

Figure 2:
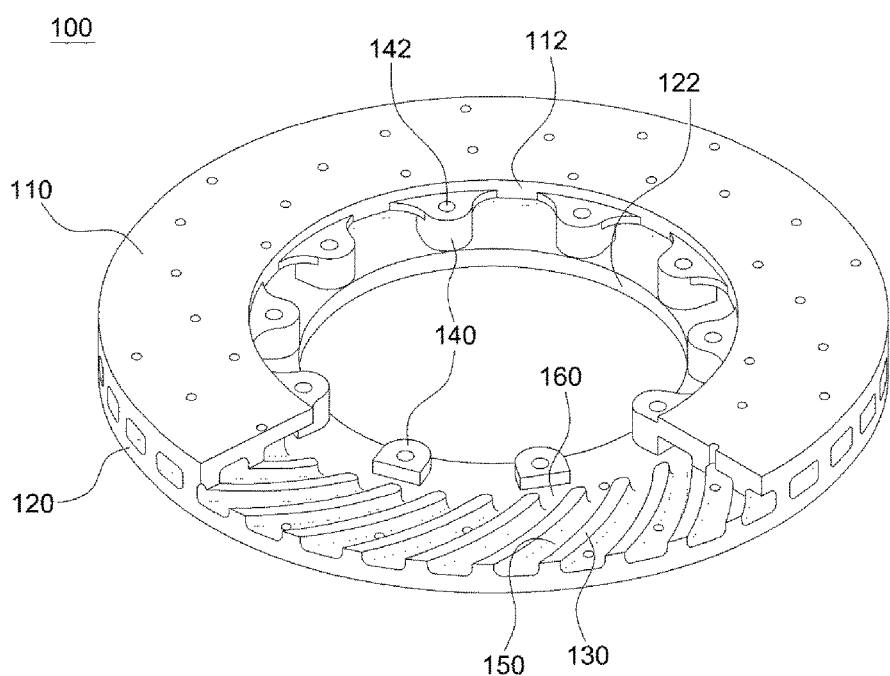
FIG. 2 is a cut-away perspective view illustrating a brake disk according to an embodiment of the present invention.
Figure 3:
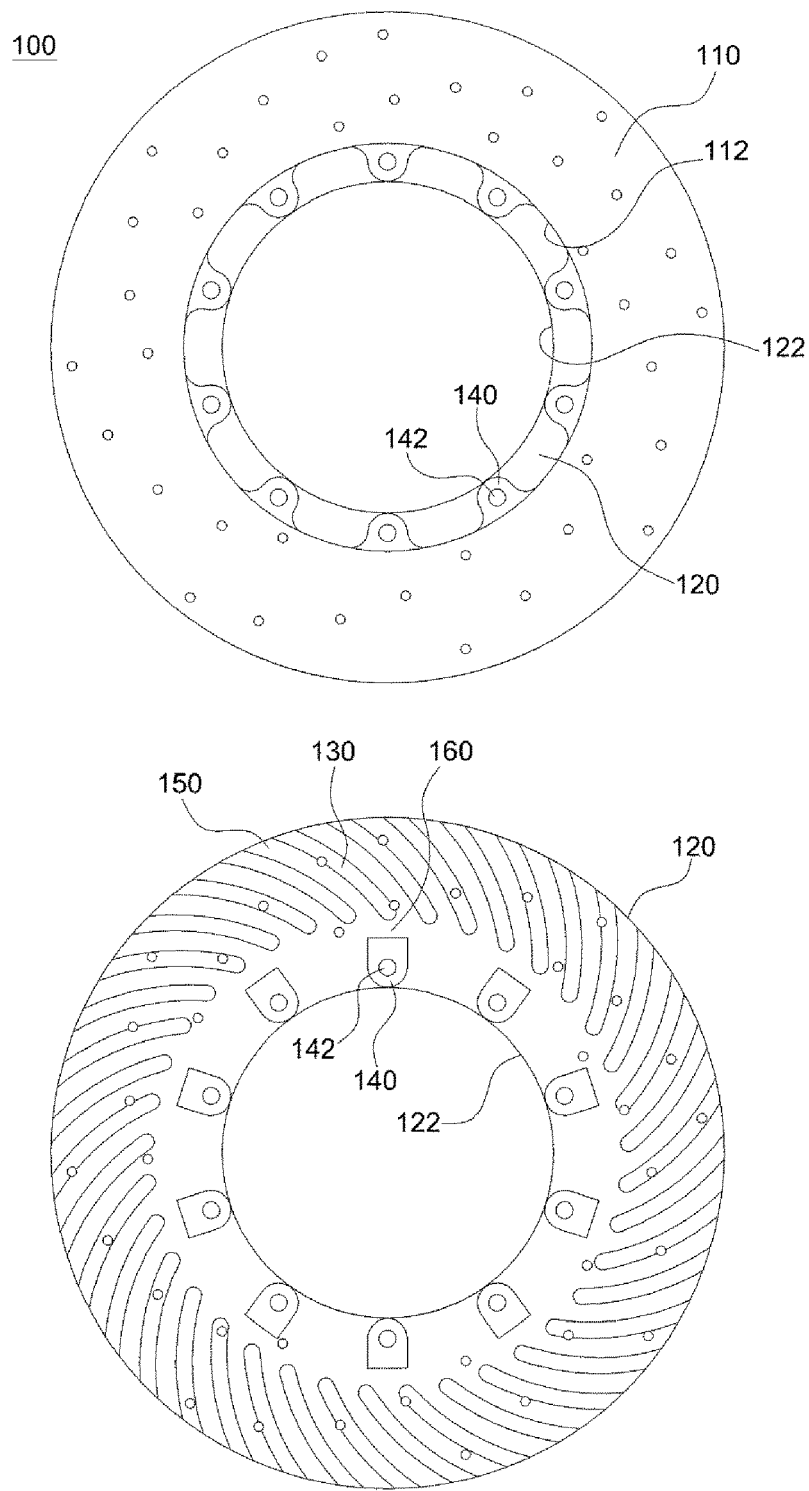
FIG. 3 is a top view illustrating a brake disk according to an embodiment of the present invention.

As shown in FIGS. 1 to 3, the brake disk 100 includes a first disk plate 110 having a hat part seating bore 112 in its central portion and a second disk plate 120 having a shaft bore 122 in its central portion.

The two disk plates 110 and 120 are formed into a laminated form with a predetermined gap therebetween and a plurality of vanes 130 are integrally formed between these disk plates 110 and 120.

In this case, the shaft bore 122 is formed in a smaller diameter than that of the hat part seating bore 112 and may have a same central axis as the hat part seating bore 112.

In addition, a plurality of mounting portions 140 are formed between the disk plates 110 and 120 to be located more inward than the vanes 130 with respect to a radial direction of the disk plates 110 and 120.

The plurality of vanes 130 are formed to extend in a spiral form with respect to the central axis of the disk plates 110 and 120 (or brake disk) and they are formed to extend from a position spaced with a predetermined distance from the mounting portions 140 to an outer diameter of the disk plates 110 and 120 (or the outer peripheral surface) with respect to a radial direction of the disk plates 110 and 120.

Cooling channels 150 for allowing air to flow therethrough are formed between the vanes 130.

The cooling channels 150 are configured as a space between the vanes 130 formed between two disk plates 110 and 120. Similarly to the vanes 130, the cooling channels 150 are also formed to extend in a spiral form with respect to the central axis of the disk plates 110 and 120 (or brake disk) and they are formed to extend from a position spaced with a predetermined distance from the mounting portions 140 to an outer diameter of the disk plates 110 and 120 (or the outer peripheral surface) with respect to a radial direction of the disk plates 110 and 120.

The plurality of mounting portions 140 are arranged at equal intervals along a circumferential direction of the disk plates 110 and 120 around the shaft bore of the second disk plate 120 and integrally formed between the hat part seating bore 112 and a first side surface of the second disk plate 120.

The plurality of mounting portions 140 are formed to be spaced with a predetermined distance from the vanes 130, thereby forming the air passage 160 for allowing air to flow therethrough between the mounting portions 140 and the vanes 130.

That is, the plurality of mounting portions 140 are positioned more inward than the air passage 160 with respect to a radial direction of the disk plates 110 and 120 while the air passage 160 is positioned more inward than the vanes 130 with respect to a radial direction of the disk plates 110 and 120.

The air passage 160 is in fluidic communication with the cooling channels 150 so that the air passing through the cooling channels 150 can flow through the air passage 160 and the air flowing through the air passage 160 can flow through the cooling channels 150.

These cooling channels 150 allow air to flow in a radial direction of the disk plates 110 and 120 while the air passage 160 allows air to flow in a circumferential direction of the disk plates 110 and 120.

Figure 4:
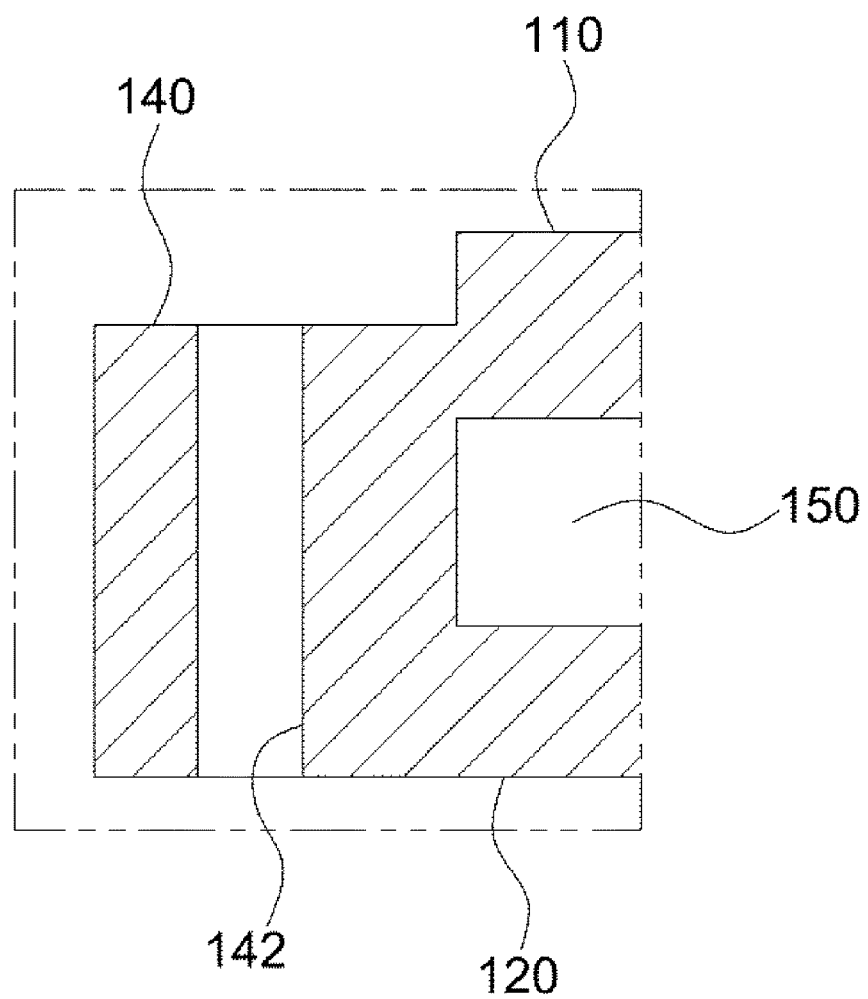
FIG. 4 is a cross sectional view taken from line A-A in FIG. 1.

As shown in FIG. 4, bushing holes 142 are formed in the respective central portions of the mounting portions 140, and the bushing holes 142 extend in a direction of the central axis of the disk plates 110 and 120 or the mounting portions 140, wherein the bushing holes 142 are formed to penetrate to the second disk plate 120.

Although not shown in the drawings, the mounting portions 140 are intended to fasten the hat part to be inserted into the hat part seating bore 112 and the brake disk 100, wherein a busing simultaneously passing through the hat part and the brake disk 100 and a fastening member are assembled with each of the bushing holes 142 so that the hat part and the brake disk 100 are coupled integrally.

Therefore, as the bushing holes 142 are formed to extend to the second disk plate 120 and hence have a depth corresponding to the thickness of the mounting portions 140 and the second disk plate 120, heat resistance and mechanical impact resistance of the brake disk 100 can be increased, thereby obtaining an effect of enhancing durability of the brake disk 100.

It is noted that the hat part is coupled with the brake disk 100 and hence serves to transfer braking force generated by friction between the brake disk 100 and a friction member to the vehicle wheels.

On the other hand, any of the plurality of vanes 130 are not connected to the mounting portions 140 but rather they are formed to be separated from the mounting portions. By virtue of this, air can flow more smoothly into the cooling channels 150 and air between the cooling channels and the air passage 160 can smoothly flow so that air flow efficiency is increased, thereby obtaining an effect of enhancing cooling performance.

Further, as the vanes 130 and the mounting portions 140 are formed in a structure in which they are separated from one another, it is possible to freely set the position and the number of the vanes 130, regardless of the position and the number of the mounting portions 140. By virtue of this, it is possible to design the number of the vanes 130 as a prime number for reducing resonance of the brake disk 100, with the result that vibration and noise of the brake disk 100 can be reduced.

That is, as the vanes 130 and the mounting portions 140 are formed in a structure in which they are separated from one another, the degree of freedom in designing the vanes 130 and the mounting portions 140 are increased. Therefore, it is possible to design the positions and the numbers of the vanes 130 and the mounting portions 140 as desired, thereby increasing fastening strength between the hat part and the brake disk 100 by the mounting portions 140.

For example, the number of vanes 130 may be any of 19, 21, 23, 27, 31, 37, 41, 43, 47, 51, 53, 57, 59, 61, 63, and 67.

This brake disk 100 may be a cast iron disk produced by casting, or a carbon ceramic disk produced by hot press molding. In this case, when the vanes are produced by core-mold casting, the degree of freedom in producing the vanes is more increased compared with in producing the structure of the vanes by machining.

Furthermore, although the foregoing is described with regard to the brake disk 100 having vanes 150 and cooling channels 150 formed in a spiral form, the brake disk 100 may have straight vanes and cooling channels instead of such spiral vanes 130 and cooling channels 150.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A brake disk having a double cooling structure, comprising:
    a plurality of vanes disposed between two disk plates including a first disk plate and a second disk plate, the vanes being formed integrally with the brake disk; and
    cooling channels and an air passage formed between the two disk plates to allow air to flow therethrough,
    wherein each of the cooling channels is formed between the plurality of vanes, the air passage is formed to be located more inward than the plurality of vanes with respect to a radial direction of the two disk plates, and the cooling channels and the air passage are in fluidic communication with each other;
    wherein a plurality of mounting portions are formed between the two disk plates and located more inward than the air passage with respect to a radial direction thereof, and
    wherein the plurality of mounting portions are formed between a hat part seating bore formed in a central portion of the first disk plate and a first side surface of the second disk plate.

2. The brake disk of claim 1, wherein the cooling channels are formed to allow air to flow in the radial direction of the two disk plates and the air passage is formed to allow air to flow in a circumferential direction of the two disk plates.

3. The brake disk of claim 1, wherein the plurality of mounting portions are arranged in a circumferential direction around a shaft bore formed in a central portion of the second disk plate.

4. The brake disk of claim 1, wherein the plurality of mounting portions are formed respectively with bushing holes penetrating in an axial direction, the bushing holes being formed to penetrate to the second disk plate.

5. The brake disk of claim 1, wherein the cooling channels are in a straight form with respect to a central axis of the brake disk.

6. The brake disk of claim 1, wherein the cooling channels are in a spiral form with respect to a central axis of the brake disk.

7. The brake disk of claim 1, wherein the vanes include a prime number to reduce resonance of the brake disk.

8. The brake disk of claim 1, wherein all the mounting portions and all the vanes are spaced with a predetermined distance to form the air passage therebetween.

* * * * *